(12) United States Patent
Chen

(10) Patent No.: US 10,997,894 B1
(45) Date of Patent: May 4, 2021

(54) ESL DRIVER CIRCUIT, HOST CIRCUIT, AND CORRESPONDING METHODS CAPABLE OF SAVING TRANSMISSION BANDWIDTH OF COMMUNICATION PROTOCOL

(71) Applicant: HIMAX TECHNOLOGIES LIMITED, Tainan (TW)

(72) Inventor: Ching-Lun Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/783,178

(22) Filed: Feb. 6, 2020

(51) Int. Cl.
| | | |
|---|---|---|
| *G09G 3/20* | (2006.01) | |
| *H04L 29/08* | (2006.01) | |
| *G09G 5/393* | (2006.01) | |
| *G09G 5/395* | (2006.01) | |

(52) U.S. Cl.
CPC .......... *G09G 3/2003* (2013.01); *G09G 5/393* (2013.01); *G09G 5/395* (2013.01); *H04L 67/12* (2013.01); *G09G 2320/0252* (2013.01); *G09G 2370/00* (2013.01); *G09G 2380/04* (2013.01)

(58) Field of Classification Search
CPC ...... G09G 3/2003; G09G 5/393; G09G 5/395; G09G 2320/0252; G09G 2380/04; G09G 2370/00; H04L 67/12
See application file for complete search history.

(56) References Cited

U.S. PATENT DOCUMENTS

| | | | | |
|---|---|---|---|---|
| 8,910,864 | B2 * | 12/2014 | Falls ................... | G06Q 20/201 235/383 |
| 2016/0026032 | A1 * | 1/2016 | Moore ................ | G02F 1/13452 382/103 |
| 2016/0078796 | A1 * | 3/2016 | Cho ..................... | G09G 3/2003 345/690 |
| 2018/0121774 | A1 * | 5/2018 | Beacham ............... | G09G 5/003 |

* cited by examiner

*Primary Examiner* — Kenneth B Lee, Jr.
(74) *Attorney, Agent, or Firm* — Winston Hsu

(57) ABSTRACT

A method of ESL driver circuit includes: receiving third-color data and black/white data transmitted from a host circuit via specific communication protocol in a first transmission mode of specific communication protocol; receiving only the third-color data transmitted from the host circuit via the specific communication protocol in a second transmission mode of specific communication protocol; using third-color data buffer to receive and buffer the third-color data transmitted from the host circuit; using black/white data buffer to receive and buffer the black/white data transmitted from the host circuit in the first transmission mode of specific communication protocol; and detecting content of the third-color data buffered in the third-color data buffer to determine whether to output data stored in the black/white data buffer as a set of black/white data outputted to ESL panel or to refill a sequence of don't-care data as the set of black/white data outputted to ESL panel.

17 Claims, 3 Drawing Sheets

ESL DRIVER CIRCUIT, HOST CIRCUIT, AND CORRESPONDING METHODS CAPABLE OF SAVING TRANSMISSION BANDWIDTH OF COMMUNICATION PROTOCOL

BACKGROUND OF THE INVENTION

1. Field of the Invention

The invention relates to an ESL display scheme, and more particularly to an ESL driver circuit, a host circuit, and corresponding methods.

2. Description of the Prior Art

For the three-color Electronic Paper Displays (EPD) or E-Ink display developed with the micro-cup (Micro-Cup) architecture, an eye-catching color (third-color) such as red or yellow (not limited) is added to the existing high-resolution and contrast black and white. The pixel data of a pixel of the micro-cup architecture is formed or encoded by two bits to display three colors; for example, the most significant bit (MSB) of the two bits is used to indicate the third-color such as red, and the least significant bit (LSB) of the two bits is used to indicate the black/white. For each pixel on the ESL (Electronic Shelf Labels) panel, a conventional ESL driver circuit needs to generate or output pixel data formed by two bits mentioned above to drive the pixel for the display. A group of pixel data is determined or generated by a conventional host circuit coupled to the conventional ESL driver circuit based on the user's requirements, and the conventional host circuit is arranged to transmit the group of pixel data each being formed by two bits to the conventional ESL driver circuit so that the conventional ESL driver circuit can use the group of pixel data to drive the pixels on the ESL panel for the display of an image/picture. The communication between the conventional host circuit and the conventional ESL driver circuit for example is based on a serial communication protocol such as the SPI protocol. Each bits of the group of pixel data is sequentially transmitted from the conventional host circuit to the conventional ESL driver circuit. The performance of ESL display and the image update speed are limited accordingly.

SUMMARY OF THE INVENTION

Therefore one of the objectives of the invention is to provide an ESL driver circuit, a host circuit, and corresponding methods to solve the above-mentioned problems.

According to an embodiment of the invention, an ESL (Electronic Shelf Labels) driver circuit to be coupled between a host circuit and an ESL panel is disclosed. The ESL driver circuit comprises a receiving circuit, a third-color data buffer, a black/white data buffer and a processing circuit. The receiving circuit is configured to receive third-color data and black/white data transmitted from the host circuit via a specific communication protocol in a first transmission mode of the specific communication protocol, and is configured to receive only the third-color data transmitted from the host circuit via the specific communication protocol in a second transmission mode of the specific communication protocol. The third-color data buffer is coupled to the receiving circuit, and is configured to receive and buffer the third-color data transferred by the receiving circuit from the host circuit. The black/white data buffer is coupled to the receiving circuit, and is configured to receive and buffer the black/white data transferred by the receiving circuit from the host circuit in the first transmission mode of the specific communication protocol. The processing circuit is coupled to the third-color data buffer and the black/white data buffer, and is configured to detect content of the third-color data buffered in the third-color data buffer to determine whether to output data stored in the black/white data buffer as a set of black/white data outputted to the ESL panel or to refill a sequence of don't-care data as the set of black/white data outputted to the ESL panel.

According to an embodiment of the invention, a host circuit to be coupled to an ESL driver circuit and to transmit data to the ESL driver circuit via a specific communication protocol is disclosed. The host circuit comprises a third-color data buffer, a black/white data buffer, a transmitting circuit, and a controlling circuit. The third-color data buffer is configured for storing third-color data to be transmitted to the ESL driver circuit. The black/white data buffer is configured for storing black/white data to be transmitted to the ESL driver circuit. The transmitting circuit is coupled to the third-color data buffer and the black/white data buffer, and is configured for receiving the third-color data from the third-color data buffer and the black/white data from the black/white data buffer. The controlling circuit is coupled to the third-color data buffer and the transmitting circuit, and is configured for detecting content of the third-color data buffered in the third-color data buffer to generate a control signal so as to determine whether to enable either a first transmission mode of the specific communication protocol or a second transmission mode of the specific communication protocol. In the second communication mode only the third-color data is transmitted from the transmitting circuit to the ESL driver circuit, and in the first communication mode both the third-color data and the black/white data are transmitted from the transmitting circuit to the ESL driver circuit.

According to an embodiment of the invention, a method utilized in an ESL (Electronic Shelf Labels) driver circuit to be coupled between a host circuit and an ESL panel is disclosed. The method comprises: receiving third-color data and black/white data transmitted from the host circuit via a specific communication protocol in a first transmission mode of the specific communication protocol; receiving only the third-color data transmitted from the host circuit via the specific communication protocol in a second transmission mode of the specific communication protocol; using a third-color data buffer to receive and buffer the third-color data transmitted from the host circuit; using a black/white data buffer to receive and buffer the black/white data transmitted from the host circuit in the first transmission mode of the specific communication protocol; and detecting content of the third-color data buffered in the third-color data buffer to determine whether to output data stored in the black/white data buffer as a set of black/white data outputted to the ESL panel or to refill a sequence of don't-care data as the set of black/white data outputted to the ESL panel.

According to an embodiment of the invention, a method utilized in a host circuit to be coupled to an ESL driver circuit and to transmit data to the ESL driver circuit via a specific communication protocol is disclosed. The method comprises: using a third-color data buffer for storing third-color data to be transmitted to the ESL driver circuit; using a black/white data buffer for storing black/white data to be transmitted to the ESL driver circuit; receiving the third-color data from the third-color data buffer and the black/white data from the black/white data buffer; detecting content of the third-color data buffered in the third-color data buffer to generate a control signal so as to determine whether to enable either a first transmission mode of the specific communication protocol or a second transmission mode of the specific communication protocol; wherein in the second communication mode only the third-color data is transmitted from the host circuit to the ESL driver circuit, and in the first communication mode both the third-color data and the black/white data are transmitted from the host circuit to the ESL driver circuit.

According to the embodiments of the invention, the transmission bandwidth the communication protocol between the host circuit and ESL driver circuit can be significantly saved, and the performance of ESL panel's display and the image update speed of the invention can be improved significantly. Also, the power consumption can be reduced, and the product lifetime of ESL driver circuit or host circuit can be extended.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a solution of a dynamic transmission operation based on a transmission/communication protocol such as a serial communication protocol such as SPI protocol wherein the dynamic transmission operation includes/defines two different transmission modes. In a first transmission mode, both third-color bits and black/white bits are transmitted from a host circuit of the invention to an ESL driver circuit of the invention, and such ESL driver circuit can use the received third-color bits and black/white bits to drive pixels on an ESL panel of the invention. In a second transmission, only third-color bits are transmitted from the host circuit of the invention to the ESL driver circuit of the invention, and such ESL driver circuit can use the received third-color bits and refill/generate don't-care bits as black/white bits to form a group of pixel data so as to use the group of pixel data to drive the pixels on the ESL panel. Thus, the redundancy of the transmission of black/white bits can be reduced when corresponding third-color bits indicate to display the third-color such as red. The performance of ESL panel's display and the image update speed of the invention are improved significantly. The embodiments of the invention are described in the following.

Figure 1:
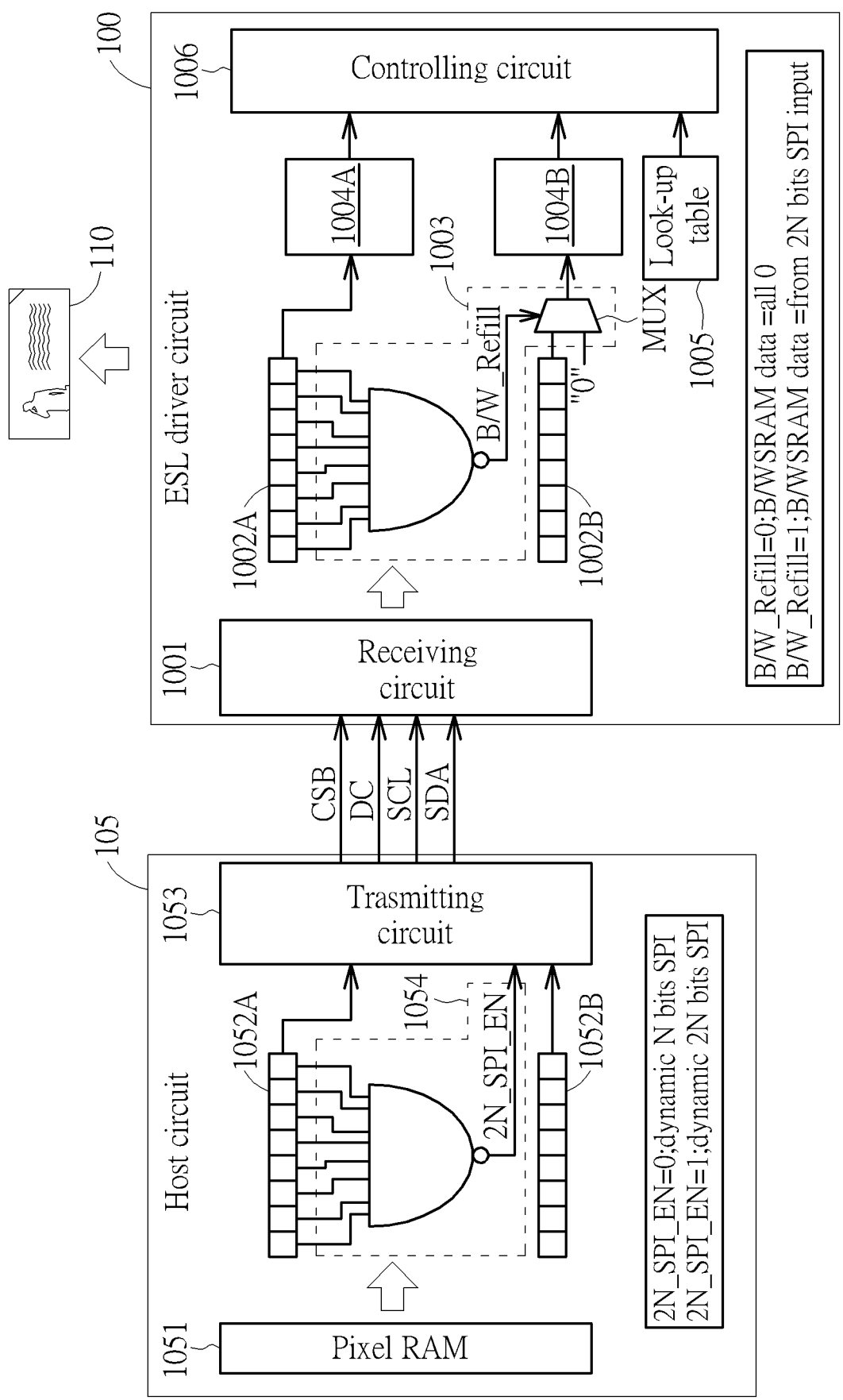
FIG. 1 is a diagram of an ESL driver circuit according to an embodiment of the invention.

Refer to FIG. 1, which is a diagram of an ESL driver circuit 100 according to an embodiment of the invention. The ESL driver circuit 100 is to be coupled between a host circuit 105 and an ESL panel 110. The host circuit 105 is arranged to send third-color data and black/white data to the ESL driver circuit 100 via a specific communication protocol such as SPI protocol (four-wire serial bus having lines/pins CSB, DC, SCL, SDA; but not limited), and the ESL panel 110 is used to display images updated by the ESL driver circuit 100 based on the third-color data and the black/white data each time.

In practice, the host circuit 105 comprises a pixel memory such as pixel RAM (random access memory) 1051, a host third-color data buffer 1052A, a host black/white data buffer 1052B, a transmitting circuit 1053, and a controlling circuit 1054. The pixel memory 1051 is used to store a group of pixel data that is determined or generated by the host circuit 105 based on the user's requirements. Each of The group of pixel data is formed by two bits comprising third-color bits and black/white bits, and the pixel memory 1051 is arranged to sequentially send a portion of the third-color bits to the host third-color data buffer 1052A and also to sequentially send a portion of the black/white bits to the host black/white data buffer 1052B. For example, the portion of third-color bits (or the portion of the black/white bits) includes N bits wherein N is a positive integer such as eight.

The host third-color data buffer 1052A is configured for storing the N bits of third-color data to be transmitted to the ESL driver circuit 100, and the host black/white data buffer 1052B is configured for storing the N bits of black/white data to be transmitted to the ESL driver circuit 100. Each of the host third-color data buffer 1052A and the black/white data buffer 1052B for example may be a first-in first-out (FIFO) buffer which may be implemented by using N flip-flops to sequentially store information content of the N bits. N for example is equal to eight (but not limited).

The transmitting circuit 1053 is coupled to the host third-color data buffer 1052A and the host black/white data buffer 1052B, and is configured for receiving the N bits of third-color data from the host third-color data buffer 1052A and the N bits of black/white data from the host black/white data buffer 1052B. The transmitting circuit 1053 is arranged to transmit both the N bits of third-color data and the N bits of black/white data to a receiving circuit of the ESL driver circuit 100 via a specific communication protocol in a first transmission mode of the specific communication protocol, and is arranged to transmit only the N bits of third-color data to the receiving circuit of the ESL driver circuit 100 via the specific communication protocol in a second transmission mode of the specific communication protocol. The transmitting circuit 1053 is arranged to dynamically determine either the first transmission mode or the second transmission for data transmission based on a control signal generated by the controlling circuit 1054. For example, the specific communication protocol is a Serial Peripheral Interface (SPI) protocol (but not limited). The first transmission mode means 2N-bits transmission mode in which the transmitting circuit 1053 is used to transmit the third-color data having N bits and the black/white data having N bits to the receiving circuit. The value of N is a positive integer such as eight (but not limited). The second transmission mode means N-bits transmission mode in which the transmitting circuit 1053 is used to transmit only the third-color data having N bits to the receiving circuit, and the receiving circuit of the ESL driver circuit 100 is arranged to refill a sequence of N bits of don't-care data by itself. Thus, the host circuit 105 is arranged to dynamically transmit N bits or 2N bits via the specific communication protocol for one time or for each time. By doing so, the total transmission time of pixel data can be decreased significantly, and thus the host circuit 105 can more rapidly and effectively transmit data to the ESL driver circuit 100 so that the ESL panel 110 can more rapidly and effectively update the displayed images.

To determine which one among the first and second transmission modes, the controlling circuit 1054 coupled to the third-color data buffer 1052A and the transmitting circuit 1053 is configured for detecting content of the third-color data buffered in the third-color data buffer 1052A to generate the control signal so as to determine whether to enable/activate the first communication mode or the second communication mode of the specific communication protocol.

In practice, for example, the pixel data of a pixel of the micro-cup architecture is formed or encoded by two bits to display three colors wherein the most significant bit (MSB) of the two bits is used to indicate the third-color such as red, yellow, or other colors, and the least significant bit (LSB) of the two bits is used to indicate the black/white. The following table shows the examples of the pixel data:

| Pixel data {Red, Black/White} | Displayed color |
| --- | --- |
| {0, 0} | Black |
| {0, 1} | White |
| {1, 0} | Red |
| {1, 1} | Red |

Alternatively, in other embodiments, the pixel data of a pixel of the micro-cup architecture may be formed or encoded by two bits to display three colors wherein the LSB of the two bits is used to indicate the third-color such as red, and the MSB of the two bits is used to indicate the black/white. The following table shows the examples of the pixel data:

| Pixel data {Black/White, Red} | Displayed color |
| --- | --- |
| {0, 0} | Black |
| {1, 0} | White |
| {0, 1} | Red |
| {1, 1} | Red |

The controlling circuit 1054 comprises a NAND gate having N input terminals respectively coupled to the N outputs of N flip-flops to receive information contents of N bits buffered in the host third-color data buffer 1052A to generate the control signal to the transmitting circuit 1053. Accordingly, a control bit 2N_SPI_EN carried by the control signal generated from the NAND gate indicates a second bit information such as '0' when all the N bits buffered in the host third-color data buffer 1052A indicate a first bit information such as '1', and instead in other situations the control bit 2N_SPI_EN carried by the control signal generated from the NAND gate indicates '1'. When the control bit 2N_SPI_EN indicates '0', the transmitting circuit 1053 is arranged to switch to the second transmission mode (i.e. N-bits transmission mode) to transmit only the N bits of third-color data to the ESL driver circuit 100. When the control bit 2N_SPI_EN indicates '1', the transmitting circuit 1053 is arranged to switch to the first transmission mode (i.e. 2N-bits transmission mode) to transmit both the N bits of third-color data and the N bits of black/white data to the ESL driver circuit 100. It should be noted that, in other circuit design, the transmitting circuit 1053 can be arranged to switch to the second transmission mode when the control bit 2N_SPI_EN indicates '1', and to switch to the first transmission mode when the control bit 2N_SPI_EN indicates '0'; this is not intended to be a limitation.

For the ESL driver circuit 100, in practice, the ESL driver circuit 100 comprises the receiving circuit 1001, a driver third-color data buffer 1002A, a driver black/white data buffer 1002B, a processing circuit 1003, a third-color data memory 1004A such as an SRAM, a black/white data memory 1004B such as an SRAM, a look-up table 1005, and a controlling circuit 1006. The ESL driver circuit 100 is arranged to receive third-color data and/or black/white data to generate corresponding control signal (s) to drive the ESL panel 110.

For data transmission each time or one time, the receiving circuit 1001 such as a slave SPI circuit is arranged to sequentially receive only the N bits of third-color data transmitted from the transmitting circuit 1053 to transfer only the N bits of third-color data to the driver third-color data buffer 1002A in the second transmission mode and is arranged to sequentially receive both the N bits of third-color data and the N bits of black/white data transmitted from the transmitting circuit to transfer the N bits of third-color data to the driver third-color data buffer 1002A and transfer the N bits of black/white data to the driver black/white data buffer 1002B in the first transmission mode.

The driver third-color data buffer 1002A for example is implemented by using a FIFO buffer which may be implemented by using N flip-flops to sequentially store information content of N bits; for example N is equal to eight. The driver black/white data buffer 1002B for example is implemented by using another FIFO buffer which may be implemented by using N flip-flops to sequentially store information content of N bits; for example N is equal to eight.

The processing circuit 1003 for example comprises a driver NAND gate and a multiplexer MUX. The driver NAND gate has N input terminals respectively coupled to N bits buffered in the driver third-color data buffer 1002A to generate an output bit to the multiplexer MUX. The multiplexer MUX has a first input coupled to an output of the driver black/white data buffer 1002B and a second input coupled to the don't-care data such as bit '0' (but not limited), and is configured to output the don't-care data when the output bit of the NAND gate is at '0'.

The third-color data memory 1004A is coupled between the driver third-color data buffer 1002A and the controlling circuit 1006, and is arranged to store the N bits of the third-color data. The black/white data memory 1004B is coupled between the processing circuit 1003 and the controlling circuit 1006, and is arranged to receive the output of the processing circuit 1003.

In the first transmission mode (i.e. 2N-bits transmission mode), not all the N bits of the third-color data buffered in the driver third-color data buffer 1002A indicate '1', and thus the output bit (B/W Refill) generated by the driver NAND gate indicates '1'. The multiplexer MUX based on the output bit '1' is arranged to determine to not refill N bits and to receive the N bits of black/white data to transfer and output the N bits to the black/white data memory 1004B. In the second transmission mode (i.e. N-bits transmission mode), all the N bits of the third-color data buffered in the driver third-color data buffer 1002A indicate '1', and thus the output bit (B/W Refill) generated by the driver NAND gate indicates '0'. The multiplexer MUX based on the output bit '0' is arranged to determine to refill N bits and to select the don't-care bit '0' as the refilled N bits as the output bits to transfer the refilled N bits to the black/white data memory 1004B.

The controlling circuit 1006 is arranged to receive data from the third-color data memory 1004A and black/white data memory 1004B, to refer to information (e.g. driving voltage(s) and/or driving parameter(s)) recorded in the look-up table 1005 to output the data and generate control signal (s) to the ESL panel 110 to drive the ESL panel 110.

Figure 2:
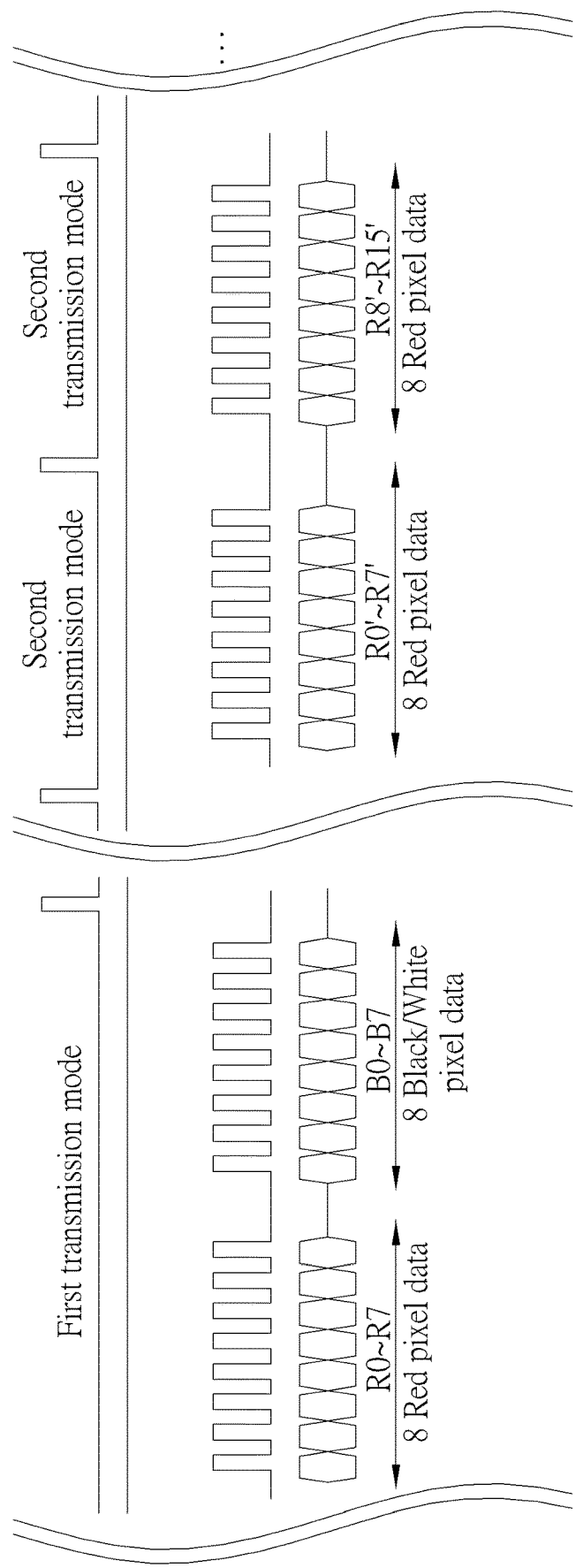
FIG. 2 is a diagram showing an example of the transmitting circuit dynamically sending data in the first transmission mode and in the second transmission mode based on the SPI communication protocol according to an embodiment of the invention.

FIG. 2 is a diagram showing an example of the transmitting circuit 1053 dynamically sending data in the first transmission mode and in the second transmission mode based on the SPI communication protocol according to an embodiment of the invention. The first transmission mode means a 16-bits transmission mode, and the second transmission mode means a 8-bits transmission mode. As shown in FIG. 2, the bits of third-color data and bits of black/white data are transmitted the line SDA of the SPI communication protocol. In the first transmission mode, the transmitting circuit 1053 transmits 8 bits (R0-R7) of third-color data such as red color pixel data on the line SDA and then transmits 8 bits (B0-B7) of black/white data such as black color pixel data on the line SDA. The combinations of bits (R0, B0), (R1, B1), . . . , and (R7, B7) respectively represent eight pixels such as pixels disposed on the (X,Y) coordinates of (0,0), (1,0), . . . , and (7,0); this is not meant to be a limitation. That is, in the first transmission mode, the transmitting circuit 1053 transmits pixel information of 8 pixels by using 16 bits. Instead, in a transmission of the second transmission mode, the transmitting circuit 1053 transmits 8 bits (R0'-R7') of third-color data such as red color pixel data on the line SDA wherein the 8 bits (R0-R7) all indicate '1', and the transmitting circuit 1053 does not transmit corresponding 8 bits of black/white data on the line SDA; such transmission is finished after the transmission of 8 bits (R0'-R7') is completed. Then, in a next transmission of the second transmission mode, the transmitting circuit 1053 transmits 8 bits (R8'-R15') of third-color data such as red color pixel data on the line SDA wherein the 8 bits (R8'-R15') all indicate '1', and also the transmitting circuit 1053 does not transmit corresponding 8 bits of black/white data on the line SDA; such transmission is finished after the transmission of 8 bits (R8'-R15') is completed. The ESL driver circuit 100 can refill the corresponding 16 bits of black/white data after receiving the 8 bits (R8'-R15') and 8 bits (R8'-R15'). That is, in the second transmission mode, the transmitting circuit 1053 can transmit pixel information of 8 pixels by using merely 8 bits.

For ESL applications, the ESL panel 110 usually is arranged to use the third-color such as red to display eye-catching fonts and totems, and the third-color usually appear continuously in some regions. Thus, there is a great probability that a host circuit needs to send 8 consecutive bits of third-color data all indicating '1' to an ESL driver circuit. By dynamically switching between the first and second transmission modes of the SPI communication protocol disclosed in the invention, the transmission bandwidth of the SPI communication protocol can be effectively saved. For example, thirty-five percent or forty percent of the transmission bandwidth can be saved. Especially, if all the pixels displayed by the ESL panel indicate the third-color, at most fifty percent of the transmission bandwidth can be saved.

Additionally, in other embodiments, displaying the third-color may employ bit '0'. For example, the pixel data of a pixel of the micro-cup architecture may be formed or encoded by two bits to display three colors wherein the MSB of the two bits is used to indicate the third-color such as red, and the LSB of the two bits is used to indicate the black/white. The following table shows the examples of the pixel data:

| Pixel data {Red, Black/White} | Displayed color |
|---|---|
| {1, 0} | Black |
| {1, 1} | White |
| {0, 0} | Red |
| {0, 1} | Red |

Alternatively, in one embodiment, the pixel data of a pixel of the micro-cup architecture may be formed or encoded by two bits to display three colors wherein the LSB of the two bits is used to indicate the third-color such as red, and the MSB of the two bits is used to indicate the black/white. The following table shows the examples of the pixel data:

| Pixel data {Black/White, Red} | Displayed color |
|---|---|
| {0, 1} | Black |
| {1, 1} | White |
| {0, 0} | Red |
| {1, 0} | Red |

Figure 3:
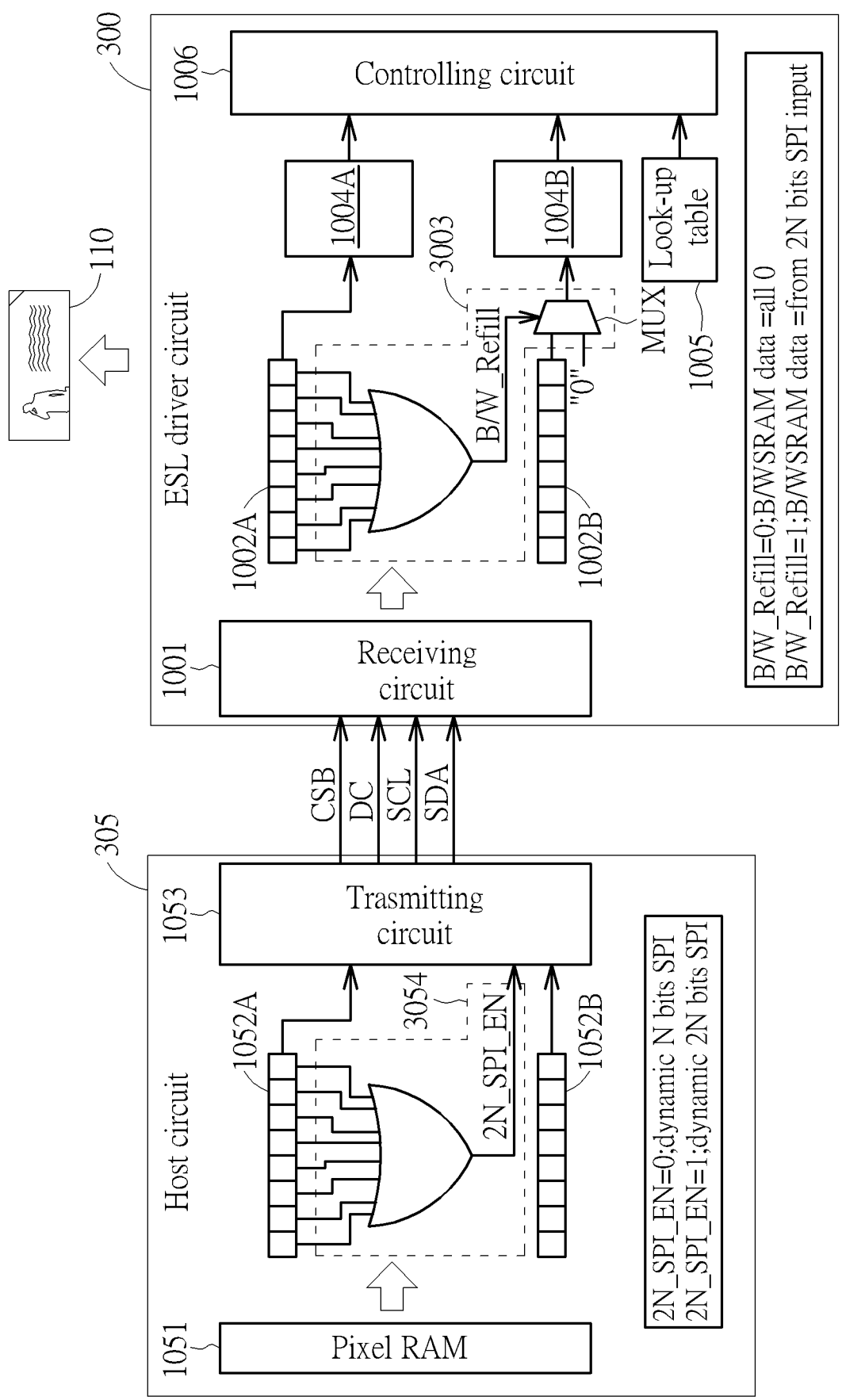
FIG. 3 is a diagram of an ESL driver circuit according to another embodiment of the invention.

FIG. 3 is a diagram of an ESL driver circuit 300 according to an embodiment of the invention. The ESL driver circuit 300 is to be coupled between a host circuit 305 and the ESL panel 110. The host circuit 305 sends third-color data and black/white data to the ESL driver circuit 300 via the specific communication protocol such as SPI protocol (four-wire serial bus having lines/pins CSB, DC, SCL, SDA; but not limited), and the ESL panel 110 displays images updated by the ESL driver circuit 300 based on the third-color data and the black/white data each time.

The host circuit 305 comprises the pixel memory 1051, the host third-color data buffer 1052A, the host black/white data buffer 1052B, the transmitting circuit 1053, and a controlling circuit 3054. The operations and functions of circuits 1051, 1052A, 1052B, and 1053 are identical to those of the circuits of FIG. 1 and are not detailed for brevity. The transmitting circuit 1053 dynamically determines either the first transmission mode or the second transmission for data transmission based on a control signal generated by the controlling circuit 3054. To determine which one among the first and second transmission modes, the controlling circuit 3054 coupled to the third-color data buffer 1052A and the transmitting circuit 1053 is configured for detecting content of the third-color data buffered in the third-color data buffer 1052A to generate the control signal so as to determine whether to enable/activate the first communication mode or the second communication mode of the specific communication protocol. In practice, the controlling circuit 3054 comprises an OR gate having N input terminals respectively coupled to the N outputs of N flip-flops to receive information contents of N bits buffered in the host third-color data buffer 1052A to generate the control signal to the transmitting circuit 1053. Accordingly, a control bit 2N_SPI_EN carried by the control signal generated from the OR gate indicates '0' when all the N bits buffered in the host third-color data buffer 1052A indicate '0', and instead in other situations the control bit 2N_SPI_EN carried by the control signal generated from the OR gate indicates '1'. When the control bit 2N_SPI_EN indicates '0', the transmitting circuit 1053 is arranged to switch to the second transmission mode (i.e. N-bits transmission mode) to transmit only the N bits of third-color data to the ESL driver circuit 100. When the control bit 2N_SPI_EN indicates '1', the transmitting circuit 1053 is arranged to switch to the first transmission mode (i.e. 2N-bits transmission mode) to transmit both the N bits of third-color data and the N bits of black/white data to the ESL driver circuit 100. It should be noted that, in other circuit design, the transmitting circuit 1053 can be arranged to switch to the second transmission mode when the control bit 2N_SPI_EN indicates '1', and to switch to the first transmission mode when the control bit 2N_SPI_EN indicates '0'; this is not intended to be a limitation.

The ESL driver circuit 300 comprises the receiving circuit 1001, the driver third-color data buffer 1002A, the driver black/white data buffer 1002B, a processing circuit 3003, the third-color data memory 1004A such as an SRAM, the black/white data memory 1004B such as an SRAM, the look-up table 1005, and the controlling circuit 1006. The processing circuit 3003 for example comprises a driver OR gate and a multiplexer MUX. The driver OR gate has N input terminals respectively coupled to N bits buffered in the driver third-color data buffer 1002A to generate an output bit to the multiplexer MUX. The multiplexer MUX has a first input coupled to an output of the driver black/white data buffer 1002B and a second input coupled to the don't-care data such as bit '0' (but not limited; this may be bit '1'), and is configured to output the don't-care data when the output bit of the OR gate is at '0'.

The third-color data memory 1004A is coupled between the driver third-color data buffer 1002A and the controlling circuit 1006, and is arranged to store the N bits of the third-color data. The black/white data memory 1004B is coupled between the processing circuit 1003 and the controlling circuit 1006, and is arranged to receive the output of the processing circuit 3003.

In the first transmission mode (i.e. 2N-bits transmission mode), not all the N bits of the third-color data buffered in the driver third-color data buffer 1002A indicate '0', and thus the output bit (B/W Refill) generated by the driver OR gate indicates '1'. The multiplexer MUX based on the output bit '1' is arranged to determine to not refill N bits and to receive the N bits of black/white data to transfer and output the N bits to the black/white data memory 1004B. In the second transmission mode (i.e. N-bits transmission mode), all the N bits of the third-color data buffered in the driver third-color data buffer 1002A indicate '0', and thus the output bit (B/W Refill) generated by the driver OR gate indicates '0'. The multiplexer MUX based on the output bit '0' is arranged to determine to refill N bits and to select the don't-care bit '0' as the refilled N bits as the output bits to transfer the refilled N bits to the black/white data memory 1004B.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ESL (Electronic Shelf Labels) driver circuit to be coupled between a host circuit and an ESL panel, comprising:
   a receiving circuit, configured to receive third-color data and black/white data transmitted from the host circuit via a specific communication protocol in a first transmission mode of the specific communication protocol, and configured to receive only the third-color data transmitted from the host circuit via the specific communication protocol in a second transmission mode of the specific communication protocol;
   a third-color data buffer, coupled to the receiving circuit, configured to receive and buffer the third-color data transferred by the receiving circuit from the host circuit;
   a black/white data buffer, coupled to the receiving circuit, configured to receive and buffer the black/white data transferred by the receiving circuit from the host circuit in the first transmission mode of the specific communication protocol; and
   a processing circuit, coupled to the third-color data buffer and the black/white data buffer, configured to detect content of the third-color data buffered in the third-color data buffer to determine whether to output data stored in the black/white data buffer as a set of black/white data outputted to the ESL panel or to refill a sequence of don't-care data as the set of black/white data outputted to the ESL panel.

2. The ESL driver circuit of claim 1, further comprising:
   a third-color data memory, coupled to the third-color data buffer, configured to receive and store the third-color data outputted by the third-color data buffer;
   a black/white data memory, coupled to the processing circuit, configured to receive and store the set of black/white data outputted to the ESL panel; and
   a controller circuit, coupled to the third-color data memory and the black/white data memory, configured to generate at least one control signal to drive the ESL panel to control display of the ESL panel according to the third-color data and the set of black/white data outputted to the ESL panel.

3. The ESL driver circuit of claim 1, wherein the specific communication protocol is a Serial Peripheral Interface (SPI) protocol.

4. The ESL driver circuit of claim 1, wherein the processing circuit is arranged to detect whether each bit of the third-color data buffered in the third-color data buffer stores a first bit information, and is arranged to generate the sequence of don't-care data when the each bit of the third-color data buffered in the third-color data buffer stores the first bit information; the processing circuit is arranged to output the data stored in the black/white data buffer in other conditions different from a condition of when the each bit of the third-color data buffered in the third-color data buffer stores the first bit information.

5. The ESL driver circuit of claim 4, wherein the third-color data buffer is arranged to buffer N-bit information, and the processing circuit comprises:
   a NAND gate having N input terminals respectively coupled to N bits buffered in the third-color data buffer to generate an output bit to a multiplexer; and
   the multiplexer having a first input coupled to an output of the black/white data buffer and a second input coupled to the don't-care data, configured to output the don't-care data when the output bit of the NAND gate is at a second bit information.

6. The ESL driver circuit of claim 1, wherein the processing circuit is arranged to detect whether each bit of the third-color data buffered in the third-color data buffer stores a second bit information, and is arranged to generate the sequence of don't-care data when the each bit of the third-color data buffered in the third-color data buffer stores the second bit information; the processing circuit is arranged to output the data stored in the black/white data buffer in other conditions different from a condition of when the each bit of the third-color data buffered in the third-color data buffer stores the second bit information.

7. The ESL driver circuit of claim 6, wherein the third-color data buffer is arranged to buffer N-bit information, and the processing circuit comprises:
an OR gate having N input terminals respectively coupled to N bits buffered in the third-color data buffer to generate an output bit to a multiplexer; and
the multiplexer having a first input coupled to an output of the black/white data buffer and a second input coupled to the don't-care data, configured to output the don't-care data when the output bit of the OR gate is at the second bit information.

8. A host circuit to be coupled to an ESL driver circuit and to transmit data to the ESL driver circuit via a specific communication protocol, comprising:
a third-color data buffer, configured for storing third-color data to be transmitted to the ESL driver circuit;
a black/white data buffer, configured for storing black/white data to be transmitted to the ESL driver circuit;
a transmitting circuit, coupled to the third-color data buffer and the black/white data buffer, configured for receiving the third-color data from the third-color data buffer and the black/white data from the black/white data buffer;
a controlling circuit, coupled to the third-color data buffer and the transmitting circuit, configured for detecting content of the third-color data buffered in the third-color data buffer to generate a control signal so as to determine whether to enable either a first transmission mode of the specific communication protocol or a second transmission mode of the specific communication protocol;
wherein in the second communication mode only the third-color data is transmitted from the transmitting circuit to the ESL driver circuit, and in the first communication mode both the third-color data and the black/white data are transmitted from the transmitting circuit to the ESL driver circuit.

9. The host circuit of claim 8, wherein the controlling circuit comprises:
a NAND gate having N input terminals respectively coupled to N bits buffered in the third-color data buffer to generate the control signal to the transmitting circuit;
wherein the transmitting circuit is arranged to transmit only the third-color data to the ESL driver circuit when a control bit carried by the control signal indicates a second bit information and is arranged to transmit both the third-color data and the black/white data to the ESL driver circuit when the control bit indicates a first bit information.

10. The host circuit of claim 8, wherein the controlling circuit comprises:
an OR gate having N input terminals respectively coupled to N bits buffered in the third-color data buffer to generate the control signal to the transmitting circuit;
wherein the transmitting circuit is arranged to transmit only the third-color data to the ESL driver circuit when a control bit carried by the control signal indicates a second bit information and is arranged to transmit both the third-color data and the black/white data to the ESL driver circuit when the control bit indicates a first bit information.

11. The host circuit of claim 8, wherein the first transmission mode means a 16-bits transmission mode, and the second transmission mode means a 8-bits transmission mode.

12. A method utilized in an ESL (Electronic Shelf Labels) driver circuit to be coupled between a host circuit and an ESL panel, comprising:
receiving third-color data and black/white data transmitted from the host circuit via a specific communication protocol in a first transmission mode of the specific communication protocol;
receiving only the third-color data transmitted from the host circuit via the specific communication protocol in a second transmission mode of the specific communication protocol;
using a third-color data buffer to receive and buffer the third-color data transmitted from the host circuit;
using a black/white data buffer to receive and buffer the black/white data transmitted from the host circuit in the first transmission mode of the specific communication protocol; and
detecting content of the third-color data buffered in the third-color data buffer to determine whether to output data stored in the black/white data buffer as a set of black/white data outputted to the ESL panel or to refill a sequence of don't-care data as the set of black/white data outputted to the ESL panel.

13. The method of claim 12, further comprising:
using a third-color data memory to receive and store the third-color data outputted by the third-color data buffer;
using a black/white data memory to receive and store the set of black/white data outputted to the ESL panel; and
generating at least one control signal to drive the ESL panel to control display of the ESL panel according to the third-color data and the set of black/white data outputted to the ESL panel.

14. The method of claim 12, wherein the specific communication protocol is a Serial Peripheral Interface (SPI) protocol.

15. The method of claim 12, wherein the detecting step comprises:
detecting whether each bit of the third-color data buffered in the third-color data buffer stores a specific bit content used for third-color display;
generating the sequence of don't-care data when the each bit of the third-color data buffered in the third-color data buffer stores the specific bit content; and
outputting the data stored in the black/white data buffer in other conditions different from a condition of when the each bit of the third-color data buffered in the third-color data buffer stores the specific bit content.

16. A method utilized in a host circuit to be coupled to an ESL driver circuit and to transmit data to the ESL driver circuit via a specific communication protocol, comprising:
using a third-color data buffer for storing third-color data to be transmitted to the ESL driver circuit;
using a black/white data buffer for storing black/white data to be transmitted to the ESL driver circuit;
receiving the third-color data from the third-color data buffer and the black/white data from the black/white data buffer;
detecting content of the third-color data buffered in the third-color data buffer to generate a control signal so as to determine whether to enable either a first transmission mode of the specific communication protocol or a second transmission mode of the specific communication protocol; wherein in the second communication mode only the third-color data is transmitted from the host circuit to the ESL driver circuit, and in the first communication mode both the third-color data and the black/white data are transmitted from the host circuit to the ESL driver circuit.

17. The method of claim 16, wherein the first transmission mode means a 16-bits transmission mode, and the second transmission mode means a 8-bits transmission mode.

* * * * *